(12) United States Patent
Liu

(10) Patent No.: US 11,500,169 B2
(45) Date of Patent: Nov. 15, 2022

(54) RECEPTACLE STRUCTURE OF THE OPTICAL CONNECTOR AND OPTICAL COMMUNICATION DEVICE USING THE SAME

(71) Applicant: Mei-Miao Liu, Miaoli County (TW)

(72) Inventor: Mei-Miao Liu, Miaoli County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 0 days.

(21) Appl. No.: 16/852,419

(22) Filed: Apr. 18, 2020

(65) Prior Publication Data
US 2021/0124137 A1   Apr. 29, 2021

(30) Foreign Application Priority Data
Oct. 25, 2019  (TW) ................................. 108138508

(51) Int. Cl.
    G02B 6/42   (2006.01)
    G02B 6/255  (2006.01)

(52) U.S. Cl.
    CPC ......... *G02B 6/4284* (2013.01); *G02B 6/2557* (2013.01); *G02B 6/4261* (2013.01); *G02B 6/4278* (2013.01)

(58) Field of Classification Search
    CPC .................................................. G02B 6/4256
    See application file for complete search history.

(56) References Cited

U.S. PATENT DOCUMENTS

| | | | | |
|---|---|---|---|---|
| 7,869,224 B1* | 1/2011 | Yang | .................... | G02B 6/4284 361/800 |
| 2003/0214789 A1* | 11/2003 | Medina | ................ | G02B 6/4246 361/729 |
| 2008/0317414 A1* | 12/2008 | Nakagawa | ........... | G02B 6/4255 385/76 |
| 2012/0289077 A1* | 11/2012 | He | ..................... | H01R 13/6595 439/350 |
| 2014/0286613 A1* | 9/2014 | Ito | ........................ | G02B 6/4292 385/88 |
| 2018/0180819 A1* | 6/2018 | Zhu | ....................... | G02B 6/3821 |
| 2020/0132944 A1* | 4/2020 | Wong | .................... | G02B 6/3825 |
| 2020/0301076 A1* | 9/2020 | Watts | ................... | G02B 6/3814 |
| 2021/0124129 A1* | 4/2021 | Liu | ........................ | G02B 6/3873 |
| 2022/0011521 A1* | 1/2022 | Tseng | .................. | G02B 6/3849 |

FOREIGN PATENT DOCUMENTS

JP    2001194562 A  *  7/2001  ........... G02B 6/3849

* cited by examiner

*Primary Examiner* — Eric Wong

(57) ABSTRACT

The present invention provides a receptacle structure for an optical connector comprising a receptacle body, and a first housing. The receptacle body has a first end and a second end for providing optical connector inserted thereto, respectively. Two sides of the first end respectively have first flexible plate having first attaching structure. The first housing, folded by a single piece material, is a closed structure having a first through hole wherein two walls of the first housing have first coupling structure for coupling to the attaching structure when the first end of the receptacle body is inserted into the first through hole whereby the first housing is completely assembled with the receptacle body. In addition, an optical communication device having the receptacle structure is also provided in which the optical connector can be inserted into the receptacle structure for optical communication.

19 Claims, 7 Drawing Sheets

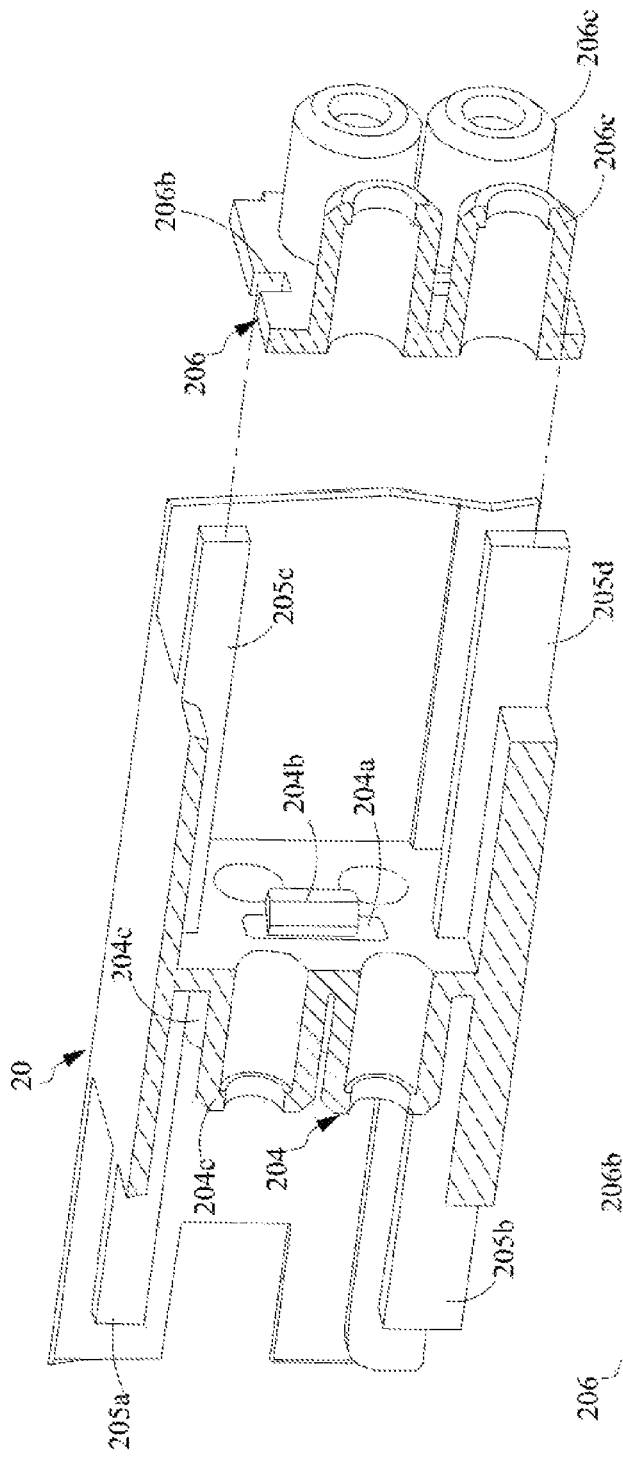
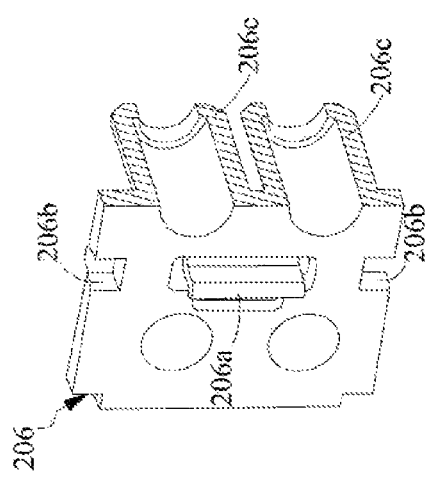
FIG. 3A
FIG. 3B

RECEPTACLE STRUCTURE OF THE OPTICAL CONNECTOR AND OPTICAL COMMUNICATION DEVICE USING THE SAME

CROSS-REFERENCE TO RELATED APPLICATION

This application claims the benefit of Taiwan Patent Application No. 108138508, filed on Oct. 25, 2019, in the Taiwan Intellectual Property Office of the R.O.C, the disclosure of which is incorporated herein in its entirety by reference.

FIELD OF INVENTION

The present invention relates to a receptacle connector. In particular, it relates to a receptacle structure for an optical connector and an optical communication device using the receptacle structure.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

For above specifications of the optical communication module, it needs to be installed on the housing of the communication device. Take the housing of the IEC specification as an example, as shown in FIG. 1A (a)~(d), such as IEC604-10A m=4 housing, as shown in (d) in FIG. 1A, the size of hole is 9.5 mm in the height direction. Since these holes are already standard products in this field of industry, they cannot be changed. In addition, the receptacle specifications for transceivers that conform to the QSFF-DD specifications also have certain specifications. For example, in the cross-sectional view of the QSFF-DD specifications receptacle shown in FIG. 1B, the dimension G in the height direction is 9.1 mm. Therefore, how the new specification of receptacle used for transceiver can be installed in the established specification of mounting holes in the lowest cost way, which is a problem to be solved.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a receptacle structure for an optical connector, and the receptacle body has a flexible plate structure. At the periphery of the flexible plate, a single metal plate is folded into a closed structure and connected to the receptacle body. The joints of the two ends of the metal plate can be spliced or overlapped after folding. The present invention utilizes the elasticity of the two side plates of the receptacle structure to assemble with the metal housing. After assembling, when the connector is inserted into the receptacle, the side plates of the connector can be expand outwardly due to the flexibility of the side plates, so that the metal housing is more firmly bonded to the receptacle body, and cannot fall out in the direction of connector insertion.

The present invention provides an optical communication device, which has an optical connector receptacle, and the optical communication device is installed into a mounting hole by a closed metal housing, so that the mounting hole of the optical communication device can maintain the original specification and a new specification of the optical connector can also be disposed in the mounting hole. In addition, because the connector receptacle and the side plate of the metal housing are flexible, when the optical connector is inserted into the receptacle, the outer wall of the optical connector can push against the side wall of the receptacle, which also drives the metal plates expand outwardly, making the metal housing never fall out of the opening of the housing, thereby ensuring the coupling effect of the optical connector.

In one embodiment of the present invention, the present invention provides a receptacle body, having at least one connecting structure, the receptacle body having a first end and a second end, which are respectively inserted by the optical connector for coupling to the connecting structure, two sides of the first end respectively having a first flexible plate, every the first flexible plate having at least one first attaching structure; and a first housing, being a closed structure having a first through hole and folded by a single material, two side walls of the first housing respectively having at least one first coupling structure, wherein the first end of the receptacle body is inserted into the first through hole and the two side walls of the first housing respectively correspond to the first flexible plate of the receptacle body, the at least one first attaching structure is assembled with the at least one first coupling structure, and the first housing is coupled to the receptacle body.

In another embodiment of the present invention, the present invention provides an optical communication device, comprising: an application device, having a housing plate comprising a mounting hole; a receptacle structure, a part of the receptacle structure passing through the mounting hole, the receptacle structure comprising: a receptacle body, having at least one connecting structure, the receptacle body having a first end and a second end, two sides of the first end respectively having a first flexible plate, every the first flexible plate having at least one first attaching structure, two sides of the second end respectively having a second flexible plate, every the second flexible plate having at least one second attaching structure; a first housing, being a closed structure having a first through hole and folded by a single material, two side walls of the first housing respectively having at least one first coupling structure, wherein the first end of the receptacle body is inserted into the first through hole and the two side walls of the first housing respectively correspond to the first flexible plate of the receptacle body, the at least one first attaching structure is assembled with the at least one first coupling structure, and the first housing is coupled to the receptacle body; and a second housing, being the closed structure having a second through hole and folded by another single material, two side walls of the second housing respectively having at least one second coupling structure, wherein the second end of the receptacle body is inserted into the second through hole and the two side walls of the second housing respectively correspond to the second flexible plate, the at least one second attaching structure is assembled with the at least one second coupling structure, and the second housing is coupled to the receptacle body, wherein a part which the first housing and the receptacle body are assembled passes through the mounting hole, the first end of the receptacle body is disposed at a first side of the housing plate, and the second end of the receptacle body is disposed at a second side of the housing plate.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

FIGS. 3A and 3B are schematic cross-sectional diagrams of an embodiment of a receptacle body in the present invention.

DETAILED DESCRIPTION OF THE PREFERRED EMBODIMENTS

Figure 1A:
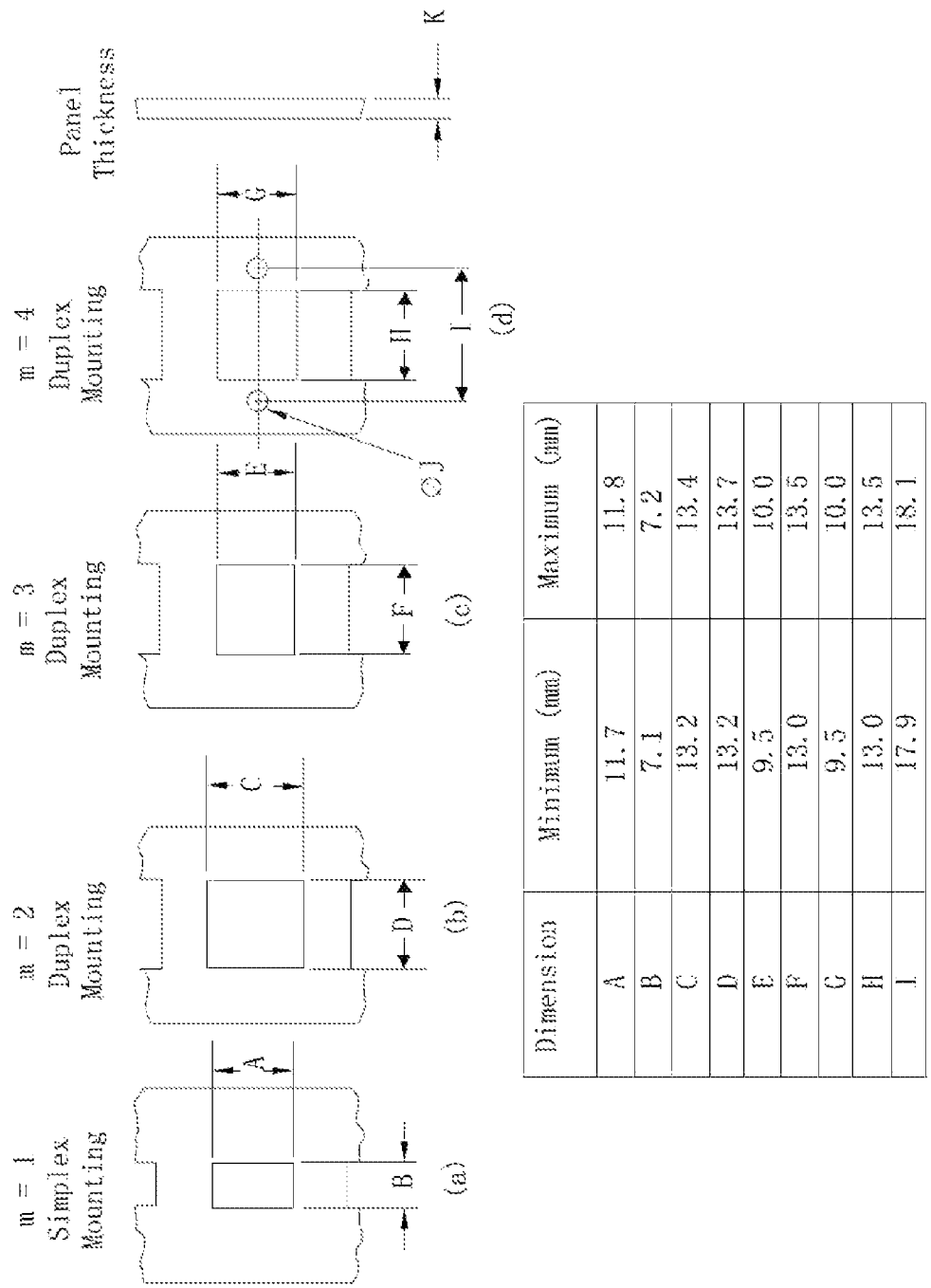
FIG. 1A is a schematic diagram of conventional metal housing plate specifications.
Figure 1B:
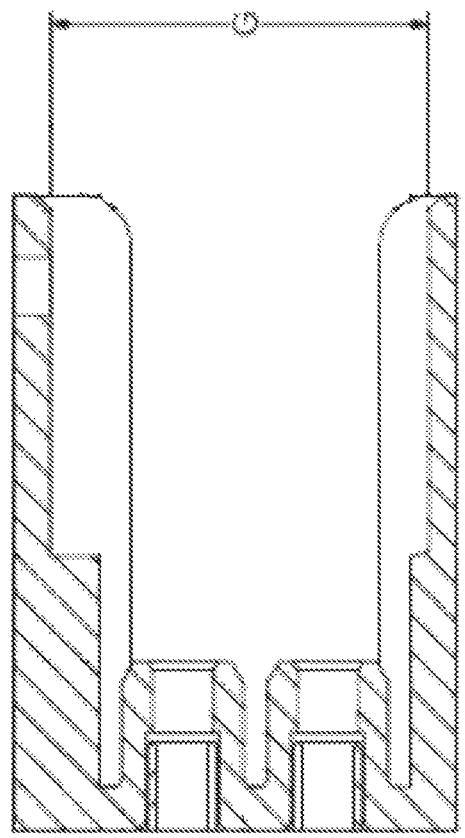
FIG. 1B is a schematic cross-sectional diagram of a conventional QSFF-DD receptacle.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a receptacle structure of an optical connector and an optical communication device using the same and to aid it of skilled in the art in practicing this invention. These embodiments are merely exemplary embodiments and in no way to be considered to limit the scope of the invention in any manner.

Figure 2A:
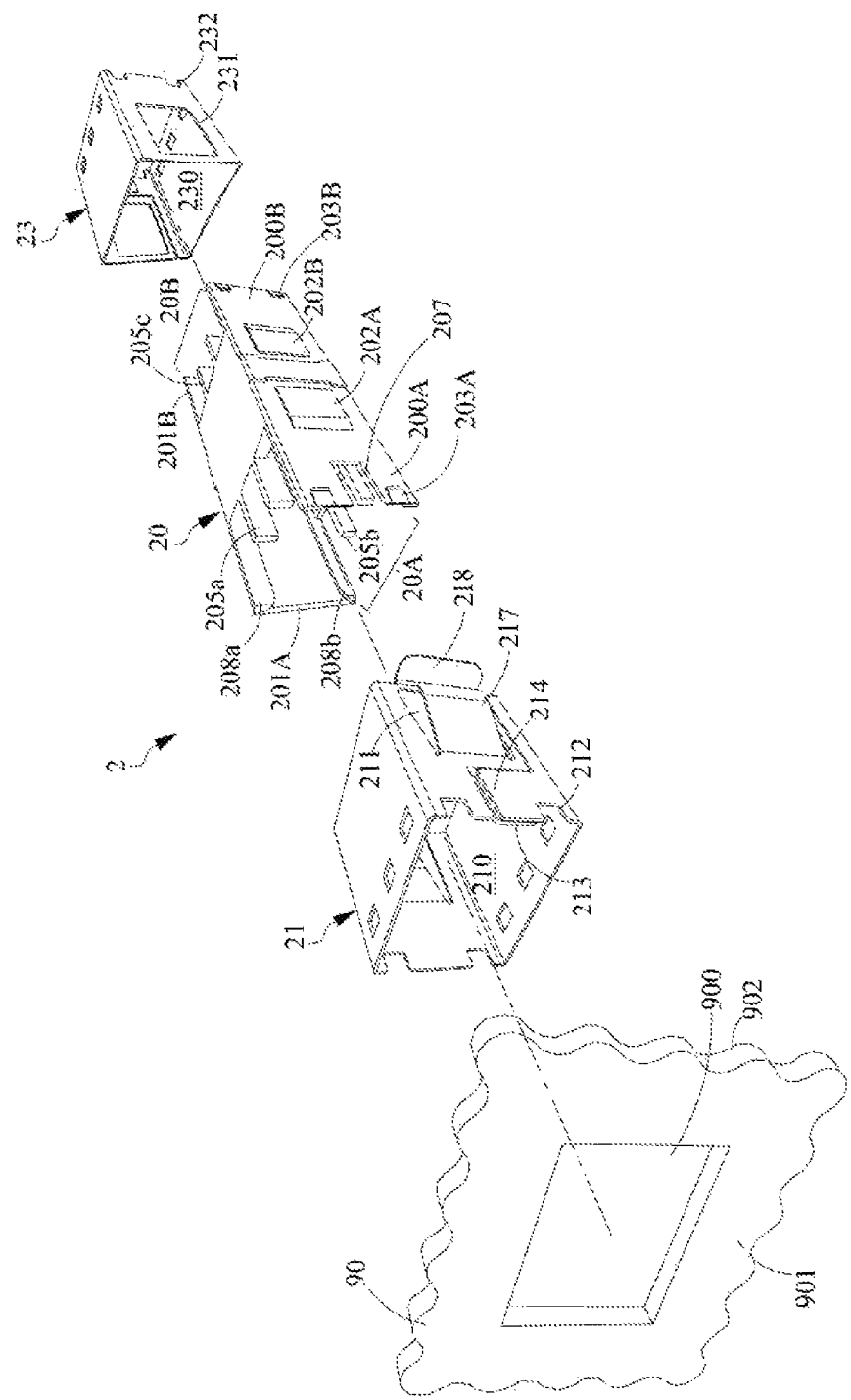
FIG. 2A is an exploded schematic diagram of an embodiment of a receptacle structure of an optical connector in the present invention.
Figure 2C:
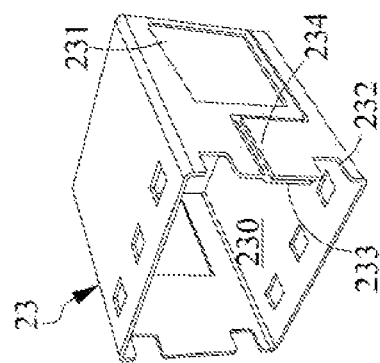
FIG. 2C is a schematic diagram from another perspective of an embodiment of a second housing in the present invention.
Figure 2B:
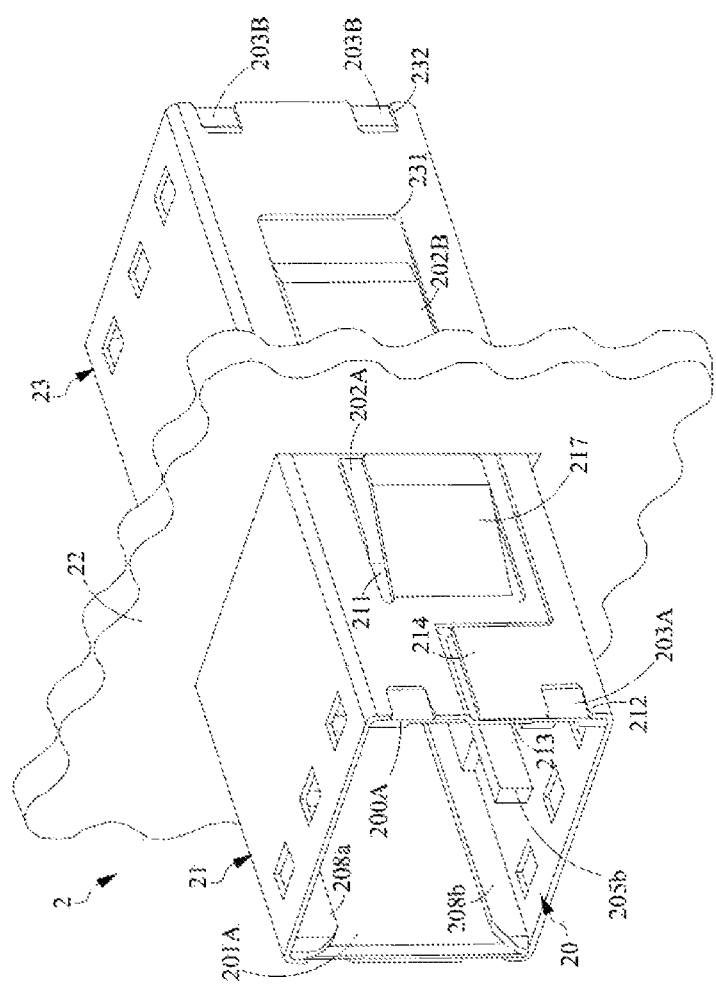
FIG. 2B is an assembly schematic diagram of an embodiment of the receptacle structure of the optical connector in the present invention.

Please refer to FIGS. 2A and 2B, FIG. 2A is an exploded schematic diagram of an embodiment of a receptacle structure of an optical connector in the present invention, and FIG. 2B is an assembly schematic diagram of an embodiment of the receptacle structure of the optical connector in the present invention. In this embodiment, the receptacle structure 2 of the optical connector includes a receptacle body 20, a first housing 21 and a second housing 23. The receptacle body 20 has a first end 20A and a second end 20B, which are respectively inserted by the optical connector. The first end 20A has first flexible plates 200A and 201A on two sides. The each first flexible plate 200A or 201A is flexible and can be deformed in accordance with an external force, and is able to return to its original position after the external force disappears. The material used for the first flexible plate is not limited, and it can be made of metal materials or polymer materials.

The each first flexible plate 200A or 201A has at least one first attaching structure. In an embodiment, the first flexible plates 200A and 201A further include a first sub-attaching structure 202A and a second sub-attaching structure 203A. In this embodiment, the first sub-attaching structure 202A or the second sub-attaching structure 203A is a convex structure that protrudes outwardly from a surface of the first flexible plate 200A or 201A. The first sub-attaching structure 202A is disposed in the middle region of the first flexible plate 200A or 201A, and two second sub-attaching structures 203A are disposed on an outer edge of the first flexible plate 200A or 201A. It should be noted that the number, location, and appearance of the first sub-attaching structure 202A and the second sub-attaching structure 203A are not limited, and anything that can achieve the coupling effect can be implemented, so that the number, appearance, and location shown in this embodiment are not limited. Similarly, there are second flexible plates 200B and 201B on two sides of the second end 20B, and a second attaching structure is set on the second flexible plates 200B and 201B. In an embodiment, the second flexible plates 200B and 201B include a third sub-attaching structure 202B and the fourth sub-attaching structure 203B. The feature of the second flexible plates 200B and 201B, the third sub-attaching structure 202B and the fourth sub-attaching structure 203B are respectively the same as that of the first flexible plates 200A and 201A, the first sub-attaching structures 202A and the second sub-attaching structures 203A described above, and unnecessary details are not repeated herein.

Please refer to FIGS. 3A and 3B, FIGS. 3A and 3B are schematic cross-sectional diagrams of an embodiment of the receptacle body in the present invention. In this embodiment, the first end 20A and the second end 20B of the receptacle body 20 can be inserted by three optical connectors, so that there are three sets of connecting structures inside the receptacle body 20, which has three sets of first coupling portion 204 on the side of the first end 20A. Three sets of first coupling portion 204 are integrally formed with the receptacle body 20. The first end 20A of the receptacle body 20 forms a space for inserting three connectors by two sets of first partition columns 205$a$ and 205$b$ arranged up and down, and each first coupling portion 204 is disposed in the space defined by the first partition columns 205$a$ and 205$b$. The second end 20B also has two sets of second partition columns 205$c$ and 205$d$ arranged up and down to form a space into which three optical connectors are inserted. The connecting structure has three sets of second coupling portions 206 on the second end 20B side, which are integrally formed and coupled to the first coupling portion 204. In this embodiment, the first coupling portion 204 has a first clip structure 204$a$, and the second coupling portion 206 has a second clip structure 206$a$ coupled to the first clip structure 204$a$, and a groove 206$b$ corresponding to the second partition columns 205$c$ and 205$d$.

In this embodiment, the second coupling portion 206 is inserted into the receptacle body 20 from the second end 20B, wherein the groove 206$b$ corresponds to the second partition columns 205$c$ and 205$d$, so that the second coupling portion 206 can be movably set into the receptacle body 20. After entering into the receptacle body 20, the first clip structure 204$a$ of the first coupling portion 204 is a through hole and there is a bump 204$b$ on a side of the first clip structure 204$a$, the second clip structure 206$a$ of the second coupling portion 206 is a hook structure, and the second clip structure 206$a$ passes through the through hole 204$a$, so that the second clip structure 206$a$ can be engaged with the bump 204$b$, whereby the first coupling portion 204 and second coupling portion 206 have a coupling effect. It should be noted that the aspect of the first clip structure 204$a$ and second clip structure 206$a$ is not limited thereto. For example, the first clip structure 204$a$ and the second clip structure 206$a$ may be interchangeable, or they can be coupled each other in various ways, which is known to those skilled in the art and unnecessary details are not repeated herein.

In addition, in this embodiment, the first coupling portion 204 has a pair of hollow first connecting column 204$c$. Similarly, each second coupling portion 206 also has a pair of hollow second connecting column 206$c$. When the first coupling portion 204 is coupled to the second coupling portion 206, the first connecting column 204$c$ and second connecting column 206$c$ respectively corresponded to the first coupling portion 204 and second coupling portion 206 would also be corresponded to each other, forming a through state. It should be noted that the number of connecting structure depends on the number of inserted optical connector, and is not limited to three in this embodiment. In addition, the first coupling portion 204 and the second coupling portion 206 are not limited in the manner described in this embodiment. For example, the first coupling portion 204 and the second coupling portion 206 may be integrally formed as an one-piece structure, which can be set into the receptacle body. The first coupling portion, the second coupling portion and the receptacle body can also be integrally formed.

Please refer to FIGS. 2A and 2B, the first housing 21 is formed by folding a single piece material, and the first housing 21 having a first through hole 210 is a closed structure. Two side walls of the first housing 21 are respectively has at least one first coupling structure. The first through hole 210 is inserted by the first end 20A of the receptacle body 20, the two side walls of the first housing 21 respectively correspond to the first flexible plates 200A and 201A on two sides of the receptacle body 20, and at least one first attaching structure is coupled to at least one first coupling structure, so that the first housing 21 is assembled with the receptacle body 20. In this embodiment, the first coupling structure further includes a first sub-coupling structure 211 and a second sub-coupling structure 212, wherein the first sub-coupling structure 211 corresponds to an opening of the first sub-attaching structure 202A, and the second sub-coupling structure 212 corresponds to a recess of the second sub-attaching structure 203A.

Figure 4:
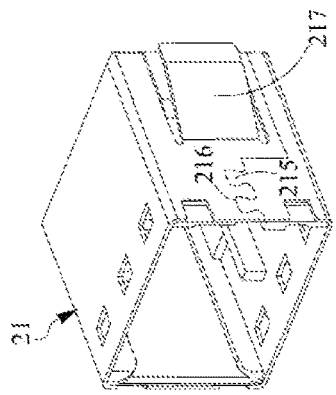
FIG. 4 is a schematic diagram of another embodiment of the first or second housing edge connected in the present invention.

Since the first housing 21 is formed by folding a single piece material, in one embodiment, two ends of the material have a first overlapping portion 213 and a second overlapping portion 214 before the first housing 21 is folded. The first overlapping portion 213 and the second overlapping portion 214 are overlapped each other after the first housing 21 forms a closed structure by folding. In this embodiment, in order to avoid increasing the thickness of outward convexity of the first housing 21 during overlapping, the first flexible plate 200A corresponded to an overlapping area has an opening 207, and the first overlapping portion 213 is a structure that is folded toward the opening 207. Therefore, when the first overlapping portion 213 and the second overlapping portion 214 are folded and overlapped, a part of the first overlapping portion 213 that is folded can be accommodated in the opening 207, and the second overlapping portion 214 may be stacked against a folded area of the first folded portion 213. Besides overlapping method, in another embodiment, as shown in FIG. 4, the first housing 21 has a first splicing portion 215 and a second splicing portion 216, which are respectively disposed at two ends of the first housing 21. After the first splicing portion 215 and the second splicing portion 216 form a closed structure by folding on the first housing 21, they are spliced together.

In addition, on two side walls of the first housing 21, an elastic inclined plate 217 is further extended to its outside, and an angle is generated between the elastic inclined plate 217 and the side wall of the first housing 21. The two side walls of the first housing 21 respectively have baffles 218, which are extended from the side wall of the first housing 21 and have an included angle with the side wall of the first housing 21. In one embodiment, the included angle is 90 degrees, but not limited thereto. As shown in FIGS. 2B and 2C, a second housing 23 is also able to be assembled with the second end 20B of the receptacle body 20, and is a closed structure formed by folding of a single piece material and has a second through hole 230. The two side walls of the second housing 22 have at least one second coupling structure, which includes a third sub-coupling structure 231 and a fourth sub-coupling structure 232. The two side walls of the second housing 22 have at least one second coupling structure, which includes a third sub-coupling structure 231 and a fourth sub-coupling structure 232. The second through hole 230 can be inserted by the second end 20B of the receptacle body 20 so that the two side walls of the second housing 23 respectively correspond to the second flexible plates 200B and 201B on two sides of the second end 20B of the receptacle body 20, the third sub-attaching structure 202B and the fourth sub-attaching structure 203B can be respectively coupled to the third sub-coupling structure 231 and the fourth sub-coupling structure 232, and the second housing 23 is able to be coupled to the receptacle body 20. In this embodiment, the configurations of the second coupling structure and the second attaching structure are similar to those of the first coupling structure and the first attaching structure, and unnecessary details are not repeated herein. The way in which the second housing 23 is folded and an edge of second housing 23 is joined in a similar manner to the first housing 21, for example, as shown in FIG. 2C, which shows that the edge of the second housing 23 is formed in such a manner that a third overlapping portion 233 and a fourth overlapping portion 234 overlap each other.

After the receptacle body 20 is assembled with the first housing 21, the metal plate 90 having a mounting hole 900 can be passed through by those. In one embodiment, the mounting hole 900 is an opening that meets a specific specification, such as the IEC specification, but it is not limited thereto. After the first housing 21 passes through the mounting hole 900 of the metal plate 90, the metal plate 90 would be disposed between the elastic inclined plate 217 and the baffle 218. Since one end of the elastic inclined plate 217 on the first housing 21 extends from the corresponding side wall toward the outer side of the first housing 21 and the direction of the metal plate 90, a first surface 901 of the metal plate 90 is blocked by the end portion of the elastic inclined plate 217, and a second surface 902 of the metal plate 90 is blocked by the baffle 218. The receptacle structure 2 of the optical connector can be fixed on the metal plate 90 by the elastic inclined plate 217 and the baffle 218. On the contrary, when the receptacle structure 2 is removed from the mounting hole 900, as long as the elastic inclined plate 217 is pressed inward, the entire receptacle structure 2 can be removed from the mounting hole 900. In addition, the thickness of the first housing 21 is used to fill the gap between the mounting hole 900 and the receptacle body 20, so that the receptacle structure 2 can be more firmly installed on the metal plate 90.

Figure 5:
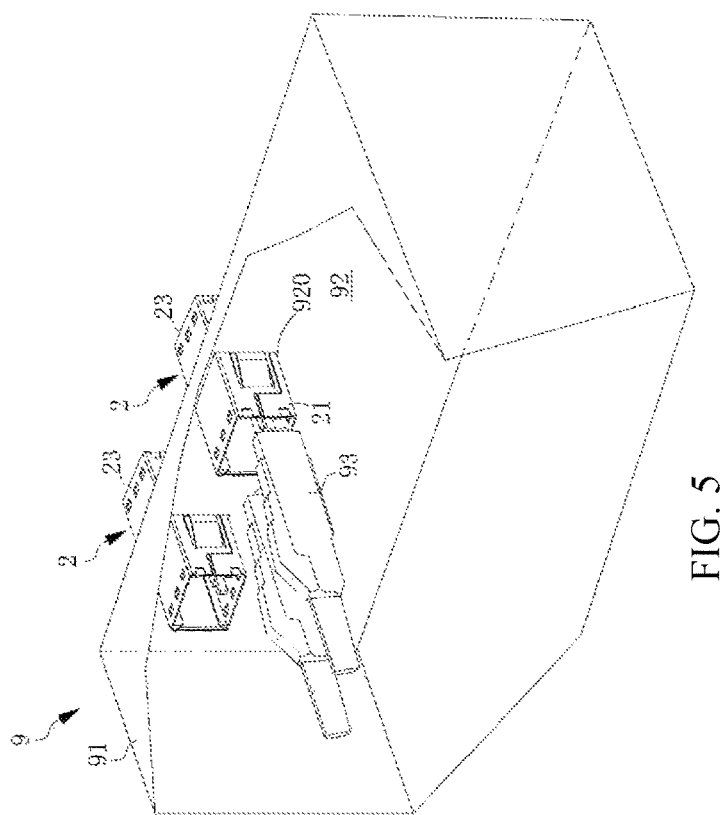
FIG. 5 is an application schematic diagram of an embodiment of an optical communication device in the present invention.

Please refer to FIG. 5, FIG. 5 is a schematic diagram of an embodiment of an optical communication device in the present invention. The optical communication device 9 includes an application device 91 having a housing plate 92. The housing plate 92 has a plurality of mounting holes 920 for mounting various connectors and power receptacles. The application device 91 may be an optical fiber communication switch, but it is not limited thereto. In this embodiment, the optical communication device 9 further includes a plurality of receptacle structures 2 installed in the mounting holes 920 of the housing plate 92 so that at least one optical connector 93 can be inserted into the receptacle structure 2. In an embodiment, the optical connector 93 may be a mini duplex connector (MDC), but it is not limited thereto. The receptacle structure 2 is as shown in the aforementioned receptacle structure of the optical connector, and unnecessary details are not repeated herein. The receptacle structure 2 is inserted from the outside of the housing plate 92 to the inside of the housing plate 92 through the first housing 21, so that the receptacle structure 2 can be firmly fixed on the housing plate 92. The fixing method is as described above, and unnecessary details are not repeated herein.

Figure 6:
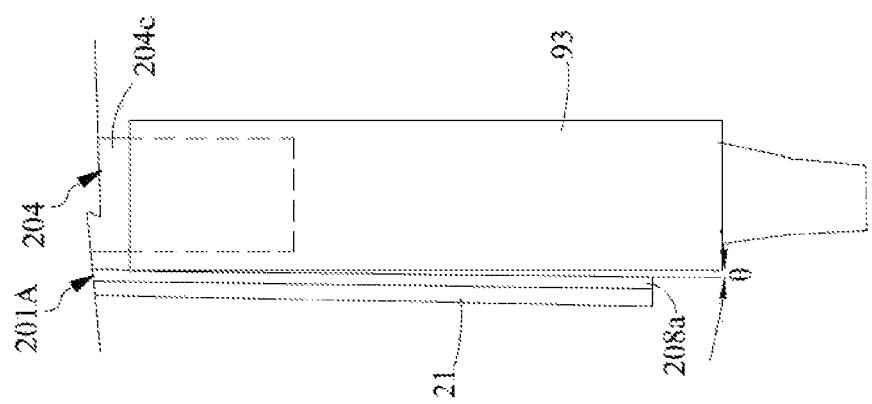
FIG. 6 is a schematic diagram of a first flexible plate being expanded by inserting the optical connector into the receptacle body in the present invention.

Next, the further effect of the receptacle structure 2 in the present invention is going to be described. Please refer to FIGS. 2A and 2B, the first flexible plate 200A, 200B and the second flexible plate 201A, 201B of the present invention have elasticity. When the optical connector 93 is inserted into the receptacle structure 2 from the first end 20A or the second end 20B, a surface of the optical connector corresponding to the first flexible board 200A, 201A or the second flexible board 200B, 201B push against the protruding portions 208a and 208b on the first flexible plate 200A, 200B and the second flexible plate 201A, 201B, so that the first flexible plate 200A, 200B or the second flexible plate 201A, 201B is pushed outwardly. As a result, a lateral plate of the first housing 21 or that of the second housing 23 respectively connected to the first flexible plate 200A, 200B or the second flexible plate 201A, 201B is further pushed outwardly, so that the first housing 21 or the second housing 23 is firmly assembled with the receptacle body 20. Due to the outward expansion of the first housing 21 and the second housing 23, the first housing 21 and the second housing 23 cannot be fallen out from the receptacle body 20 and the receptacle structure 2 has a better coupling effect. Please refer to FIG. 6, which illustrates the first flexible plate 201A contacting with the optical connector 93. When the optical connector 93 is inserted into the receptacle body and coupled to the first connecting column 204c, the left side of the connector 93 pushes against the protruding portions 208a on the inner surface of the flexible plate 201A. As a result, the first flexible plate 201A is pushed outwardly, thereby expanding the first housing 21 outwardly by an angle θ.

In summary, the receptacle structure of the present invention has the following features: (1) the first housing and the second housing have a closed structure, which is bent into an overall outline by using a single piece of sheet metal, rather than using two pieces of sheet metal. The joint can be overlapped, spliced or docked; (2) the first housing and the second housing are coupled to the receptacle body in a snap-fit manner, respectively. During assembly, the optical connector is inserted in the direction of insertion, but it does not fall out in reverse direction; (3) the plates on two sides of the receptacle body are flexible, when the optical connector is inserted into the receptacle structure, the side plates can be pushed outwardly, thereby allowing the first housing and the second housing to expand outwardly. As a result, the first housing and the second housing are not easily fallen out from the insertion direction, thereby making the receptacle structure more firmly fixed.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A receptacle structure for an optical connector, comprising:
 a receptacle body, having at least one connecting structure, the receptacle body having a first end and a second end, the optical connector coupled to the connecting structure through the first end and the second end, a first flexible plate being flexible and extended from two sides of the first end respectively, the first flexible plate having at least one first attaching structure; and a first housing, being a closed structure, and having a first through hole and a single folded material, two side walls of the first housing respectively having at least one first coupling structure, wherein the first end of the receptacle body is inserted into the first through hole and the two side walls of the first housing respectively correspond to the first flexible plate of the receptacle body, the at least one first attaching structure is assembled with the at least one first coupling structure, and the first housing is coupled to the receptacle body, wherein the first flexible plate has a protruding portion, when the receptacle structure is inserted by the optical connector, the protruding portion is pushed against by the optical connector, so that the first flexible plate is pushed outwardly.

2. The receptacle structure of claim 1, wherein the at least one first attaching structure comprises a first sub-attaching structure and a plurality of second sub-attaching structure, the first sub-attaching structure protrudes outwardly from a surface of the first flexible plate, the plurality of second sub-attaching structure are disposed on an edge of the first flexible plate, and protrudes outwardly from the surface of the first flexible plate.

3. The receptacle structure of claim 2, wherein the at least one first coupling structure comprises a first sub-coupling structure and a plurality of second sub-coupling structure, the first sub-coupling structure and the plurality of second sub-coupling structure are openings which respectively correspond to the first sub-attaching structure and the plurality of second sub-attaching structure for protruding outwardly from the openings.

4. The receptacle structure of claim 1, wherein the first housing comprises a first overlapping portion and a second overlapping portion, which are disposed at two ends of the first housing, and the first overlapping portion and the second overlapping portion are partially overlapped by folding the first overlapping portion and the second overlapping portion.

5. The receptacle structure of claim 1, wherein the first housing comprises a first splicing portion and a second splicing portion, which are disposed at two ends of the first housing, and the first splicing portion and the second splicing portion are spliced by folding the first splicing portion and the second splicing portion.

6. The receptacle structure of claim 1, wherein two sides of the second end respectively comprises a second flexible plate, the each second flexible plate has at least one second attaching structure.

7. The receptacle structure of claim 6, comprising:
a housing plate, having a mounting hole which allows the receptacle body to pass through, the first end of the receptacle body disposed at a first side of the housing plate and the second end of the receptacle body disposed at a second side of the housing plate; and
a second housing, being the closed structure having a second through hole and folded by the single material, two side walls of the second housing respectively having at least one second coupling structure, wherein the second end of the receptacle body is inserted into the second through hole and the two side walls of the second housing respectively correspond to the second flexible plate, the at least one second attaching structure is assembled with the at least one second coupling structure, and the second housing is coupled to the receptacle body.

8. The receptacle structure of claim 1, wherein an elastic inclined plate is extended from the two side walls of the first housing, and an end of the each elastic inclined plate is extended from the corresponding side wall of the first housing towards the housing plate.

9. The receptacle structure of claim 7, wherein the two side walls of the first housing respectively comprise baffles corresponding to the first side of the housing plate.

10. The receptacle structure of claim 7, wherein a thickness of the first housing is used to fill a gap between the mounting hole and the receptacle body.

11. An optical communication device, comprising:
an application device, having a housing plate comprising a mounting hole;
a receptacle structure, a part of the receptacle structure passing through the mounting hole, the receptacle structure comprising:
a receptacle body, having at least one connecting structure, the receptacle body having a first end and a second end, a first flexible plate being flexible and extended from two sides of the first end respectively, the first flexible plate having at least one first attaching structure, two sides of the second end respectively having a second flexible plate, every the second flexible plate having at least one second attaching structure;
a first housing, being a closed structure, and having a first through hole and a single folded material, two side walls of the first housing respectively having at least one first coupling structure, wherein the first end of the receptacle body is inserted into the first through hole and the two side walls of the first housing respectively correspond to the first flexible plate of the receptacle body, the at least one first attaching structure is assembled with the at least one first coupling structure, and the first housing is coupled to the receptacle body; and
a second housing, being the closed structure, and having a second through hole and the single folded material, two side walls of the second housing respectively having at least one second coupling structure, wherein the second end of the receptacle body is inserted into the second through hole and the two side walls of the second housing respectively correspond to the second flexible plate, the at least one second attaching structure is assembled with the at least one second coupling structure, and the second housing is coupled to the receptacle body,
wherein a part which the first housing and the receptacle body are assembled passes through the mounting hole, the first end of the receptacle body is disposed at a first side of the housing plate, and the second end of the receptacle body is disposed at a second side of the housing plate,
wherein the first flexible plate has a protruding portion, when the receptacle structure is inserted by the optical connector, the protruding portion is pushed against by the optical connector, so that the first flexible plate is pushed outwardly.

12. The optical communication device of claim 11, wherein an elastic inclined plate is extended from the two side walls of the first housing, and an end of the each elastic inclined plate is extended from the corresponding side wall of the first housing towards the housing plate.

13. The optical communication device of claim 11, wherein the two side walls of the first housing respectively comprise baffles corresponding to the first side of the housing plate.

14. The optical communication device of claim 11, wherein a thickness of the first housing is used to fill a gap between the mounting hole and the receptacle body.

15. The optical communication device of claim 11, wherein the at least one first attaching structure comprises a first sub-attaching structure and a plurality of second sub-attaching structure, the first sub-attaching structure protrudes outwardly from a surface of the first flexible plate, the plurality of second sub-attaching structure are disposed on an edge of the first flexible plate, and protrudes outwardly from the surface of the first flexible plate.

16. The optical communication device of claim 15, wherein the at least one first coupling structure comprises a first sub-coupling structure and a plurality of second sub-coupling structure, the first sub-coupling structure and the plurality of second sub-coupling structure are openings which respectively correspond to the first sub-attaching structure and the plurality of second sub-attaching structure for protruding outwardly from the openings.

17. The optical communication device of claim 11, wherein the first housing comprises a first overlapping portion and a second overlapping portion, which are disposed at two ends of the first housing, and the first overlapping portion and the second overlapping portion are partially overlapped by folding the first overlapping portion and the second overlapping portion.

18. The optical communication device of claim 11, wherein the first housing comprises a first splicing portion and a second splicing portion, which are disposed at two ends of the first housing, and the first splicing portion and the second splicing portion are spliced by folding the first splicing portion and the second splicing portion.

19. The optical communication device of claim 11, comprising an optical connector, which is inserted into the first end or the second end and coupled to the connecting structure, wherein when the optical connector is inserted into the receptacle body through the first end or the second end, a side wall of the optical connector pushes the first flexible plate or the second flexible plate outwardly and against the first housing or the second housing.

\* \* \* \* \*